(12) United States Patent
Koopman, Jr. et al.

(10) Patent No.: US 12,541,688 B2
(45) Date of Patent: Feb. 3, 2026

(54) SYSTEMS AND METHODS FOR EVALUATING PERCEPTION SYSTEM QUALITY

(71) Applicant: Edge Case Research, Inc., Pittsburgh, PA (US)

(72) Inventors: Philip J. Koopman, Jr., Pittsburgh, PA (US); Michael David Wagner, Pittsburgh, PA (US); Elizabeth Ann Osyk, Twinsburg, OH (US)

(73) Assignee: Edge Case Research, Inc., Pittsburgh, PA (US)

( * ) Notice: Subject to any disclaimer, the term of this patent is extended or adjusted under 35 U.S.C. 154(b) by 1073 days.

(21) Appl. No.: 17/291,493

(22) PCT Filed: Nov. 4, 2019

(86) PCT No.: PCT/US2019/059619
§ 371 (c)(1),
(2) Date: May 5, 2021

(87) PCT Pub. No.: WO2020/096941
PCT Pub. Date: May 14, 2020

(65) Prior Publication Data
US 2022/0004818 A1    Jan. 6, 2022

Related U.S. Application Data

(60) Provisional application No. 62/755,629, filed on Nov. 5, 2018.

(51) Int. Cl.
*G06N 3/084*    (2023.01)
*G06F 18/21*    (2023.01)
(Continued)

(52) U.S. Cl.
CPC .......... *G06N 3/084* (2013.01); *G06F 18/214* (2023.01); *G06F 18/217* (2023.01);
(Continued)

(58) Field of Classification Search
CPC ..... G06F 18/214; G06F 18/217; G06N 3/045; G06N 3/084; G06V 10/774; G06V 10/776; G06V 10/98
See application file for complete search history.

(56) References Cited

U.S. PATENT DOCUMENTS 10,468,062 B1 *  11/2019  Levinson .................. G06N 3/08
10,832,093 B1 *  11/2020  Taralova .................. G06N 3/08
(Continued)

OTHER PUBLICATIONS

Boenisch F., et al., "Tracking All Members of a Honey Bee Colony Over Their Lifetime Using Learned Models of Correspondence," arXiv:1802.03192v2 [cs.CV], arxiv.org, Mar. 15, 2018, 25 pages.
(Continued)

*Primary Examiner* — Chau T Nguyen
(74) *Attorney, Agent, or Firm* — Babst Calland Clements; Thomas Joseph

(57) ABSTRACT

A system and method for measuring the performance of a perception system is provided that includes obtaining a pair of sensor data input streams to be evaluated by the perception system. Data augmentation is then added into at least one of the pair of sensor data input streams and the pair of sensor data input streams is then processed with the perception system to obtain a first detection list and a second detection list. The first detection list is then compared with the second detection list to identify one or more perception weaknesses.

20 Claims, 8 Drawing Sheets

(51) Int. Cl.
  *G06F 18/214* (2023.01)
  *G06V 10/774* (2022.01)
  *G06V 10/776* (2022.01)
  *G06V 10/98* (2022.01)

(52) U.S. Cl.
  CPC .......... *G06V 10/774* (2022.01); *G06V 10/776* (2022.01); *G06V 10/98* (2022.01)

(56) References Cited

U.S. PATENT DOCUMENTS

| | | | | |
|---|---|---|---|---|
| 11,017,550 | B2* | 5/2021 | Frossard | G06N 3/045 |
| 2002/0105428 | A1 | 8/2002 | Benson et al. | |
| 2006/0009951 | A1 | 1/2006 | Tryon et al. | |
| 2016/0245899 | A1 | 8/2016 | Rybski | |
| 2017/0139411 | A1 | 5/2017 | Hartung et al. | |
| 2018/0314253 | A1* | 11/2018 | Mercep | G06F 18/24 |
| 2019/0130214 | A1* | 5/2019 | N | G06N 3/084 |
| 2019/0347494 | A1* | 11/2019 | Gerardo Castro | G06V 20/58 |
| 2020/0134510 | A1* | 4/2020 | Basel | G06N 3/084 |

OTHER PUBLICATIONS

Extended European Search Report for Application No. EP19881331 mailed on Jul. 15, 2022, 10 pages.

Gao J., et al., "Workshop track—ICLR 2017 Deepcloak: Masking Deep Neural Network Models for Robustness Against Adversarial Samples," arXiv:1702.06763v8 [cs.LG] Apr. 17, 2017, 8 pages.

He, K., "Mask RCNN, arXiv: 1703.06870 [cs.CV], " revision of Jan. 24, 2018, 12 pages.

Pezzementi, Z., "Putting Image Manipulations in Context: Robustness Testing for Safe Perception," IEEE International Symposium on Safety, Security, and Rescue Robotics (SSRR), Aug. 2018, 8 pages.

Redmon J. and Farhadi A., "YOLOv3: An Incremental Improvement," arXiv: 1804.02767v1 [cs.CV], revision as of Apr. 8, 2018, 6 pages.

Kaipa et al, "Addressing perception uncertainty induced failure modes in robotic bin-picking", Robotics and Computer-Integrated Manufacturing vol. 42, 2016.

International Search Report in PCT/US2019/059619 mailed Jan. 14, 2020.

\* cited by examiner

SYSTEMS AND METHODS FOR
EVALUATING PERCEPTION SYSTEM
QUALITY

CROSS REFERENCE TO RELATED APPLICATIONS

This patent application is an international application and claims priority from U.S. Provisional Application Ser. No. 62/755,629 entitled "METHOD AND APPARATUS FOR QUALITY MONITORING OF SYSTEMS" filed Nov. 5, 2018, the entire specification of which is incorporated by reference herein.

FIELD OF THE INVENTION

The present invention relates to novel approaches for detecting anomalies, defects, or brittleness in the performance of perception systems. More particularly, the invention relates to a perception evaluation system that compares perception results from the outputs of multiple perception algorithms and/or multiple different instances of one or more perception algorithms to detect potential perception weaknesses, failures, or faults.

BACKGROUND OF THE INVENTION

Perception systems are widely used in robotics applications, including self-driving cars, other autonomous vehicles, other mobile robots, and stationary robotic systems such as robotic arms, factory automation equipment, and so on. A perception system takes one or more data samples as inputs and classifies or otherwise identifies objects or other aspects of the data samples. This includes, without limitation, a perception system that takes one or more still images or a stream of images and classifies the contents of the images by object type (e.g., person, vehicle, building, roadway; using bounding boxes, performing image segmentation, identifying specific features such as lane markings) or scenario characteristic (e.g., free space, degree of risk for situation, weather conditions). Such perception systems commonly use deep learning, convolutional neural networks, and other techniques known in the art.

It is important to ensure that the perception system is robust in terms of being able to properly detect, classify, or otherwise produce desired results from a variety of data input values. It is desirable to avoid and detect perception failures, which can include, without limitation, misclassification, missed detections (false negatives), false detections (false positives), and other failures to correctly identify objects, structures, regions, pixels, or other aspects of a sensor data, a series of sensor data samples, recorded data or other types of data. We use the term "perception failure" to encompass all such problems with a perception system. Perception failures can be intermittent, context dependent, and triggered by subtle and slight changes in input data values that might not be perceptible to an ordinary human observer.

What is needed is a way to detect perception weaknesses and failures. It is also important to predict perception failures both temporally and in terms of brittleness (perception failures caused by changes to input data values). Further, the ability to detect and predict perception failures in both off-line operational modes (batch processing) and on-line operational modes (processing of streaming data) would be beneficial.

SUMMARY OF THE INVENTION

In a first aspect, a method for measuring the performance of a perception system is provided that includes obtaining a pair of sensor data input streams to be evaluated by the perception system. Data augmentation is then added into at least one of the pair of sensor data input streams and the pair of sensor data input streams is then processed with the perception system to obtain a first detection list and a second detection list. The method next calls for comparing the first detection list with the second detection list to identify one or more perception weaknesses.

In a second aspect, a system for measuring the performance of a perception system is provided. The system comprises a memory or other data storage facility and one or more processors that work in conjunction with one another in order to perform the steps of the method disclosed above.

DETAILED DESCRIPTION OF THE DRAWINGS

This disclosure is directed to a method and apparatus for identifying perception failures by comparing object detections produced by perception systems resulting from raw data streams and augmented data streams. In embodiments, the raw data stream may be temporally spaced or may represent real time events. As used herein, the term "temporally spaced" refers to the time at which data was sampled, and thus applies to either batch or otherwise delayed on-line processing modes.

Figure 1:
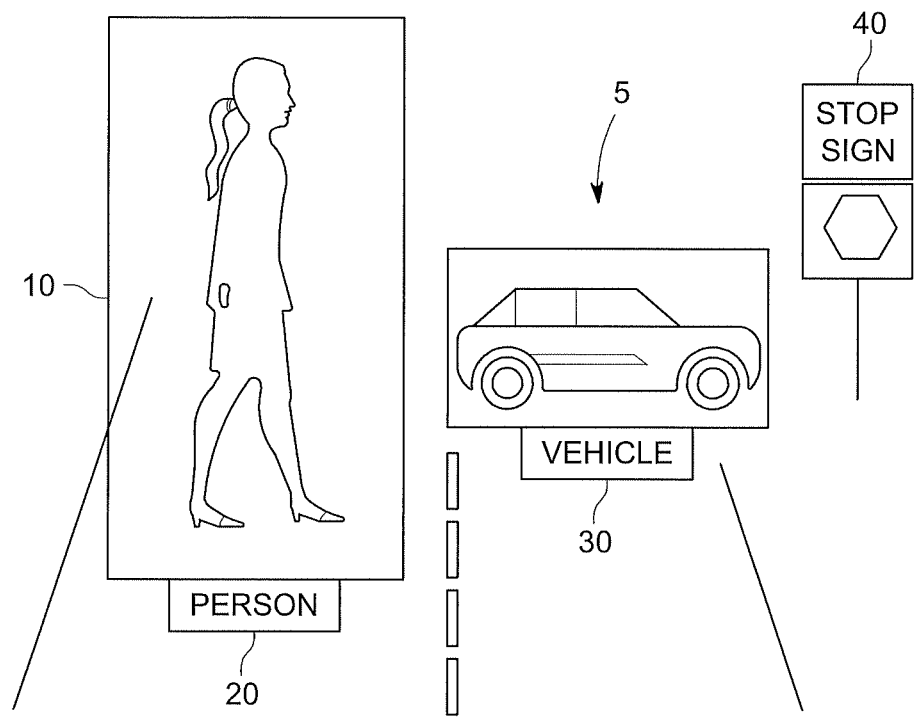
FIG. 1 is an illustration of example bounding boxes that are known in the art.

A baseline perception system, typical of those in the art, receives raw data, such as camera sensor data, and processes the raw data with a perception processing function. One example of a perception processing function is a machine learning-based function implemented as a convolutional neural network. The output of the perception system is a set of detections of objects identified within the raw data which can be presented as bounding boxes, classifications such as "person" or "vehicle", Machine Learning (ML) Confidence annotations, region labels, pixel labels, motion prediction values, and other annotations. FIG. 1 is an example of sample perception system output 5. The raw data has been modified with bounding boxes 10 and identifications 20-40. When "perception failures" are discussed herein, they include the failure to detect an object, falsely detecting an object that is not actually there, and misidentifications for one or more objects.

Determination of the appropriate statistical confidence level for any given detection attempt performed on real world data is uncertain. This is because so-called "confidence" values for machine learning based systems (ML Confidence), commonly used in the art, relate to values in the training and validation data sets and are used as a basis for determining a detection threshold tuned to those data sets. In contrast, real world operation often results in ML Confidence values that do not correspond to the probability of correct classification on data not contained in the training or validation data sets. As an illustrative example, ML Confidence value might be computed as 90% or greater for a false positive classification, or less than 10% for a false negative classification, while in both cases in reality the image is quite near the decision threshold (i.e., a change in the image that a person would perceive as small would cause the classification to change dramatically, notwithstanding the purportedly clear-cut ML Confidence value assigned to the classification).

Using the systems and methods set forth herein, however, differences in detection results on the same raw data stream are used to detect such perception failures by determining that a detection is actually near the detection/non-detection decision boundary (i.e. is uncertain) even though the system-reported ML Confidence value indicates that the detection/non-detection is highly certain.

Figure 2:
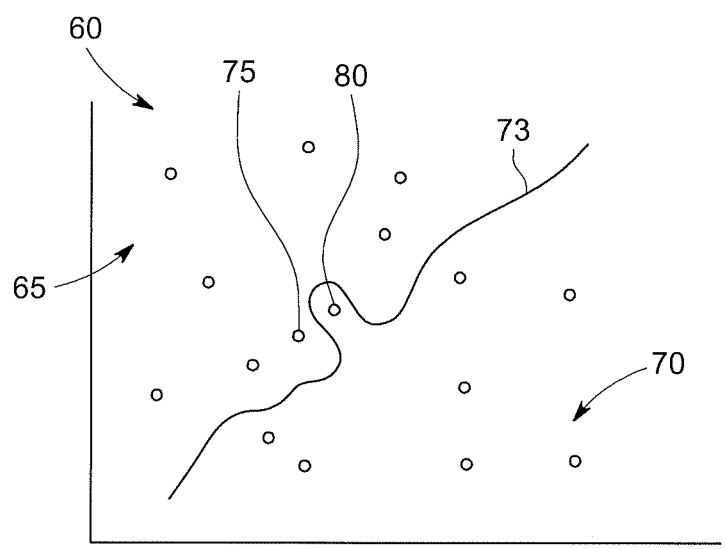
FIG. 2 is an illustrative example of training data for a machine learning-based perception algorithm.

To illustrate this point, FIG. 2 shows an example of a set of training data 60. A first portion 65 of the training data 60 represents object detections from separate images that have been identified as "person;" whereas a second portion 70 of the training data 60 represents object detections from separate images that have been identified as "tree." A classification decision boundary line 73 in the data 60 represents when the trained perception system will identify in an object as a person or a tree. A person wearing brown pants in this training data 60 is being classified as a "person" with high ML Confidence in one image 75 but is classified as a "tree" with high ML Confidence in a different image 80, even though the image is near the decision boundary in terms of small changes to the image as perceived by a human viewing the image.

In one embodiment of the perception evaluation systems and methods disclosed, a single raw data stream is replicated so that there are at least two identical copies of the data stream. One of those copies then undergoes a data augmentation process. In embodiments, data augmentation includes introducing data noise of various types, including but not limited to Gaussian blur and Gaussian noise. In embodiments, the purpose of the noise is to perturb one data stream slightly in a way that has the possibility of causing one or more objects in the data stream to cross a classification decision boundary line 73 or other decision boundary when classified by a machine learning-based perception system. Those of skill in the art will recognize that other types of noise can be added to the data stream in a particular branch. The raw and augmented data streams are then run through perception processing and differences between detection results, such as detection in one set of results but not detection in the other, are used to indicate the possibility of a perception weakness or failure.

In certain alternate embodiments, a time series of data samples, representing different points in time for a given data stream, is used to detect objects that change classification or flicker in and out of detection within a predetermined length of time or number of samples. Having an object change classification or flicker in an out of detection is also indicative of a weakness in the perception system that should be investigated.

Certain embodiments of the method and system of the present disclosure perform analysis of multiple detections produced by the perception system. In one embodiment the multiple detections compared are responsive to different augmentations of the input data. In other embodiments the multiple detections compared are from a single stream of temporally different detections, with still other embodiments involving combinations of these embodiments. The input data stream can be, without limitation, recorded field data, live data, data involving hardware-in-the-loop test apparatus, or data generated by a software simulator.

Referring to an embodiment disclosed in FIG. 2, a perception system 100, can implement aspects of the described subject matter. In certain embodiments, sensor data 110 is collected by using a dashcam, such as a Magellan MiVue 420, mounted on a passenger vehicle, such as a 2012 Volvo XC-60, in accordance with any manufacturer instructions. Preferably the sensor data 110 is video footage recorded at Super HD video resolution (1296p), although other resolutions can also be used. In one embodiment, the perception processing is performed in a batch mode, with the input data being recorded on an external storage device 120, such as a SD memory card of a type recommended by the camera manufacturer and transferred to a computing device 130 such as a laptop computer and from there to a cloud computing infrastructure for processing.

In certain embodiments, an unmodified version of the sensor data 110 is processed by the perception algorithm 140. The perception algorithm 140 used can be YOLOv3™ or, alternately, MASK R-CNN. In one embodiment, the perception algorithm 140 runs on an Amazon AWS Elastic Compute Cloud node of type p3.2xlarge, which contains a graphic processor (GPU). In another embodiment, the perception algorithm 140 runs on a laptop computer with an integrated GPU of type System 76 model Oryx Pro™ running Linux version Ubuntu 18.04, which laptop is also used for other functions such as reading data from the camera SD card. As will be appreciated by a practitioner of skill in the art, any perception algorithm 140 and computer system capable of processing the sensor data 110 could be used, since a purpose of this procedure is to evaluate the effectiveness of the perception algorithm 140 and any training weights or other configuration information that has been tailored to the intended perception application. The output of this step is a first perception output, called the first detection list. In an embodiment, this detection list and other detection lists are stored in a file system using MongoDB® Atlas™. As used herein, and at the time of the filing of this application, YOLOv3 is a common law mark of XNOR.AI, Inc. of Seattle, Wash. Oryx Pro is a trademark of System76 of Denver, Co., and MongoDB® is a registered trademark of Mongodb, Inc. of New York, NY and Atlas™ is a common law mark of Mongodb, Inc.

In embodiments, other types of sensor data 110 can be used with appropriate perception algorithms 140, including, for example, lidar, flash lidar, radar, stereo camera, ultrasound sonar, and other sensing modalities. While many of the examples and embodiments discussed and disclosed herein refer to "images," such use is not intended to limit the disclosure to a single frame in a digital video as many other types of data can be evaluated with the systems and methods set forth herein.

A second, augmented version of the input data is also created by running an augmentation algorithm 150 on the data feed. In certain embodiments, the data augmentation type is Gaussian noise, with a standard deviation of 30, added to each pixel on a frame-by-frame basis. In embodiments, Gaussian noise is added to an image frame in the following manner: On a pixel by pixel basis in the image frame, each pixel value in RGB space has a noise value numerically added to it. This noise value is based on pseudorandom values drawn from a Gaussian distribution with a mean of zero and a standard deviation of 30. Each of the three RGB channels has an independently computed pseudorandom value from that distribution added. (Thus, there are three independent pseudorandom values selected, with each value being added to one of the Red, Green, and Blue data values comprising the pixel value.) The noise values for each pixel are generated independently via a new trio of samples from that Gaussian distribution for each pixel in the image.

A further embodiment uses the same noise pattern on each subsequent frame in a video stream to improve computational speed by avoiding the need to compute a different noise pattern for each subsequent frame. A further embodiment uses a randomized selection made from a set of precomputed noise patterns for each frame.

Additional embodiments use other sensor data augmentations, such as Gaussian blur, photorealistic haze, photorealistic defocus, alpha channel blend, JPEG compression, brightness alteration, salt and pepper, dropped channel, additive noise, convolutional operations (e.g., using a convolution kernel with a set of predetermined weights as is known in the art), and other methods of introducing noise, distortion, and other image modification including setting one or more pixels to fixed values. Noise levels and other augmentation parameters can be varied to optimize computational performance and fault detection capability. While such noise approaches are relevant for other types of image data (including, for example, Gaussian noise for infrared images), other noise approaches would be relevant for other sensor modalities. For example, lidar data and radar data that contain ranging information would be augmented with variations in intensity and distance using Gaussian noise approaches and the like.

The output of the augmentation algorithm is fed to a second copy of the perception algorithm 160, producing a second set of perception outputs, called the second detection list. In an alternate embodiment, the same instance of the perception algorithm can be run twice on two sets of inputs to process both the first (unmodified) and second (augmented) sets of data inputs to produce the two detection lists.

The output of the perception algorithm is a list of objects, with each object having one or more of an object or other classification type and a classification ML Confidence. Each object can additionally have an object location, time information, trajectory information, expected future behavior information, and other annotations as determined by the perception algorithm.

To determine if an object or other classification criterion has been detected, the perception system preferably sets a detection threshold responsive to the use of the perception system in the intended application that is compared against the classification ML Confidence for a threshold value. An ML Confidence value at or above a threshold value (such as 30%, for example) indicates that an object or other classification criterion has been detected, and an ML Confidence below the threshold value means that the perception system has proposed the possible existence of an object but the object has not been considered detected. In other words, a low ML Confidence object detection is ignored and treated as a non-detection. This use of a threshold plays a pivotal role in preventing false detections (false positives), and therefore the threshold value tends to be greater than zero percent. Often, the threshold is set to a value optimized as part of the machine learning training process.

One of the problems with these types of systems is that it is not always readily apparent where the actual detection/non-detection dividing line should be in a particular data set that has not been used for machine learning training. Thus, an object that should be detected might be assigned a comparatively low ML Confidence near the detection threshold due to superficial differences compared to training data, causing it to flicker in and out of detection status from frame to frame or be detected most—but not all—of the time due to an ML Confidence value that is only slightly above the detection threshold. Alternately, the ML Confidence assigned to an object might swing wildly between high and low values due to subtle differences from frame to frame. This uncertainty is generally unacceptable in an autonomous operational system.

In certain embodiments, an off-line approach is used where the sensor data 110 is first stored in a database and then run through the perception algorithm 140 with the resulting detection list stored in another file. Separately, the previously recorded sensor data 110 is augmented with noise 150 and run through the perception algorithm 160 a second time, with the results also stored 120 in a computer 130 as previously described.

A comparison block 170 compares the output from the raw sensor data with the output from the augmented sensor data and generates a list of detections that differ, which are otherwise known as perception failures 180. As an illustrative example, if a pedestrian is detected with 80% ML Confidence (above a hypothetical detection threshold of 50%) in an unmodified image, and the pedestrian is detected with a 20% ML Confidence in that same frame of the augmented image stream (below the hypothetical detection threshold of 50%), the detection list differs in that the pedestrian is present in the unmodified image but not the augmented image, and a perception failure has been detected. A similar result would occur if the augmented image stream had no detection of the pedestrian at all (an ML Confidence of zero). A perception algorithm failure also would occur if the augmented data detection list had a detection above threshold that was missing (or below threshold) for the unmodified data detection list.

In certain embodiments, crossing the pre-set detection threshold is not used to determine perception failures, and instead, a predetermined difference in ML Confidence values is used. In such embodiments, if the absolute value of the difference between the ML Confidence value of raw sensor detection data and the ML Confidence value of the augmented detection data for a particular detection is greater than a predetermined difference, a perception failure is indicated, regardless of the perception system's detection threshold. This embodiment considers a large change in ML Confidence in response to a small black box disturbance of the image to be indicative of a brittle perception function. As used herein, a black box disturbance is one based on an augmentation function that does not take into account the specific design or neural network weights used in the perception system. Black box disturbances also apply to other embodiments.

In certain embodiments, the comparison operation is performed by a comparison function with detection lists read from a computer database that holds recorded baseline and augmented perception algorithm outputs as previously described. In other embodiments, such as in an on-line system, the data flows depicted in FIG. 3 can be formed in real time, with frame-by-frame processing and comparison occurring in a streaming fashion, such as performing perception failure detection during operation of a vehicle on a roadway FIG. 4 illustrates a sample implementation of the disclosed perception evaluation system and method. Sensor data in the form of a MP4 Video file 200, for example, is fed into a software-based object recognition system (referred to as a "Perception System" herein), which is the System Under Test (SUT) 201, where it is uploaded and stored in a storage repository 220. An example of a SUT is YOLOv3™. Examples of such storage devices include computer hard drives, cloud storage such as an Amazon S3 bucket, the customer's data center, or some combination thereof.

Next, the sensor data is processed by the SUT in order to establish a baseline result for later comparison, generating a video 240. This result also produces a set of metadata, such as bounding boxes surrounding the objects detected by the SUT, object identification, ML Confidence level, and other types of information. All of this metadata is then saved in a database for further evaluation, such as a MongoDB® Atlas™ database 241 for example.

The next step includes augmentation 250 of the sensor data associated with the SUT in a systematic manner, such as with Gaussian or other noise as described herein. The SUT 201 is then run again on the augmented data, producing a second set of bounding boxes and associated metadata relative to the augmented sensor data. This bounding box data is then transferred to the database via the message broker 260 and ingestor 261, and then saved in the database where results of each run of the SUT are compared 270, correlating the bounding boxes in the baseline run with the bounding boxes in the augmented run for each frame.

Where the comparison module or step has identified differences between the two sets of bounding boxes and metadata, an algorithm 280 is run to determine where differences have occurred and feeds that data back to the database 241. Next, in certain embodiments, the database 241 is queried to output images of the original sensor data, with colored bounding boxes indicating where the augmented SUT run succeeded or failed to detect objects identified in the baseline SUT run. These results are then analyzed by the relevant user.

Figure 3:
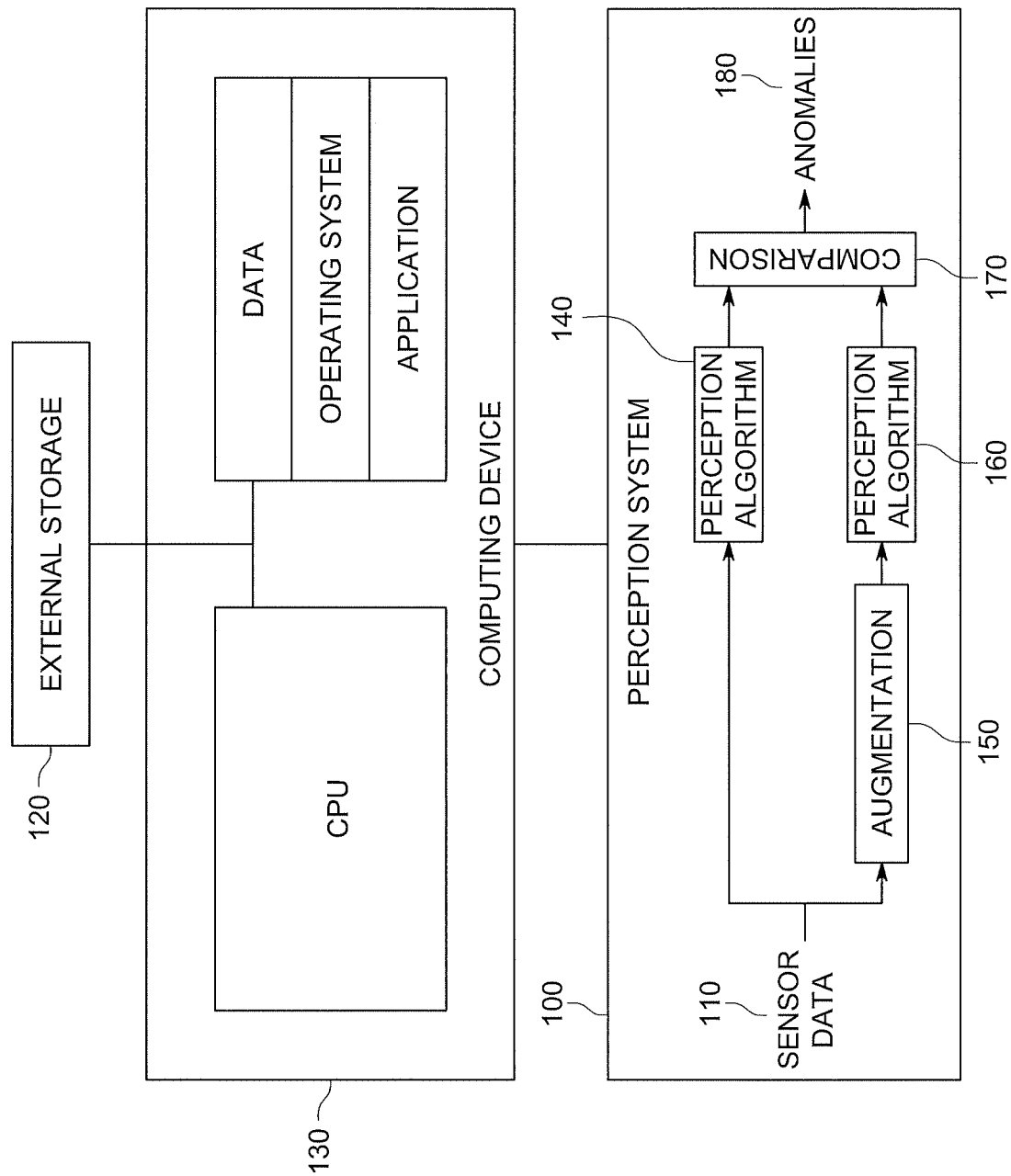
FIG. 3 is a block diagram of an apparatus that can implement an embodiment of a perception evaluation system.
Figure 4:
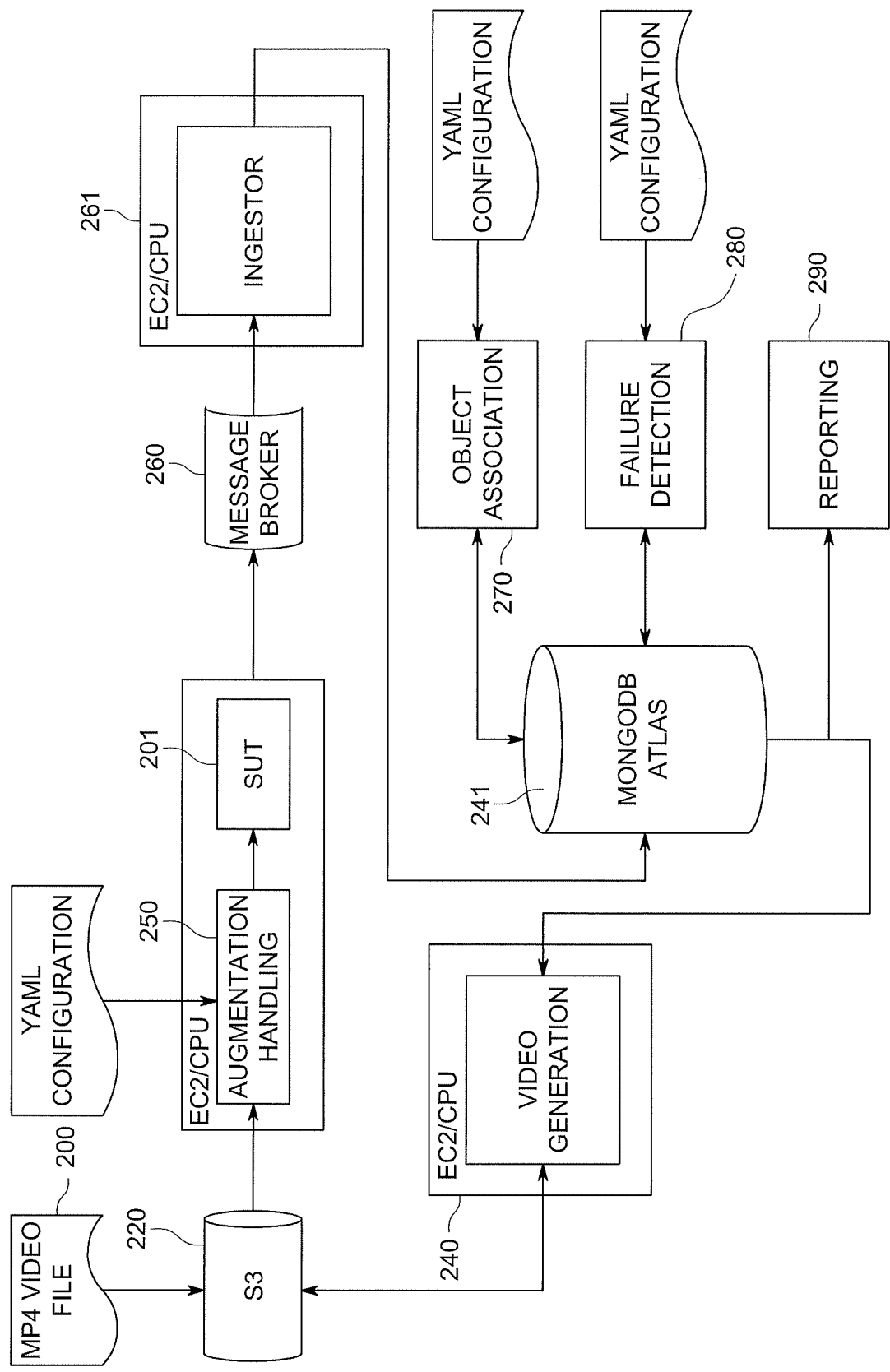
FIG. 4 is a schematic illustration of a computer-implemented embodiment of a perception evaluation system in accordance with the present disclosure.

As used in FIG. 3, "EC2" refers to a computing instance within Amazon Web Services' Elastic Compute Cloud. EC2 instances marked with "EC2/CPU" contain only a central processing unit, those marked with "EC2/GPU" also contain a graphics processing unit. The term "ingestor" refers to a software process to insert data into the database.

While embodiments of the disclosed perception evaluation system and method can identify potential failures, there are a number of heuristics that can be applied to reduce perception failure false alarms, reduce processing load and increase processing speed. These include the following techniques:

(a) only objects of interest are checked for perception failures; for example, only pedestrians are checked for perception failure, with other objects ignored.

(b) small objects based on bounding box size are disregarded; for example, only objects larger than 5% of the vertical size of the camera image in height are checked for perception failures.

(c) objects at the edges of the image or frame are disregarded; for example, objects only with bounding boxes that extend more than 5% of the horizontal size of the camera image away from the vertical edge of the image (i.e., extending sufficiently toward the center from the left and right edges of the image) are considered when checking for perception failures.

(d) objects that are detected in the baseline (unmodified) image but not detected in the augmented image are declared to be perception failures.

(e) objects must persist for a predetermined number of frames in the baseline image to be considered legitimate detections; for example, objects in the baseline image that appear for only one frame are discarded from the detection list being considered. However, even a single frame of non-detection in the augmented data detection list is still considered a perception failure. In some embodiments, object tracking, such as via detecting overlap in bounding boxes between successive frames in the baseline image, is used in determining object persistence The system and method presently disclosed can also be used to predict false positives based on patterns in detection and non-detection. Predictions can be made responsive to detecting a time delay between the loss of a detection in the augmented data and the baseline data. Consider, for example, a situation in which the perception function detects a pedestrian in some frame N of the augmented data. The pedestrian becomes undetected in the next frame N+1 and potentially additional subsequent augmented data frames. However, the pedestrian remains detected by the perception system for baseline data for both frames N and N+1. Thus, for frame N, both baseline and augmented data result in a detection. But for frame N+1 the baseline data results in a detection but the augmented data results in a non-detection. This indicates that the baseline data has gone from a strong detection to a weak detection. When, in frame N+2, neither baseline nor augmented data results in a detection, it is likely that the object is still present for one or more subsequent images and that the lack of detection is due to perception brittleness rather than complete occlusion or the object moving out of frame. Thus, the sequence of a loss of detection in augmented data followed by loss of detection in baseline data predicts that the baseline data has suffered a false negative perception failure.

Additionally, weak detections (detection in baseline data but no detection in augmented data) generally predict that there will be false negatives at some future time for future similar images even if a false negative does not occur in a particular observed image sequence. In practice, it has been observed that weak detections often correspond to gaps in training data, and therefore predict misclassification including false negatives on some images containing objects that are under-represented in the machine learning training data set.

Put another way, the true strength of a machine learning detection is the degree to which data augmentation does not change the ML Confidence. If a very slight change in image data causes a dramatic change in ML Confidence, then the ML Confidence value was misleading, and the detection was brittle. If a moderate change in image data (that degrades but does not heavily obscure the object in the data) causes a small change in ML Confidence then the detection (or non-detection) was robust.

Figure 5:
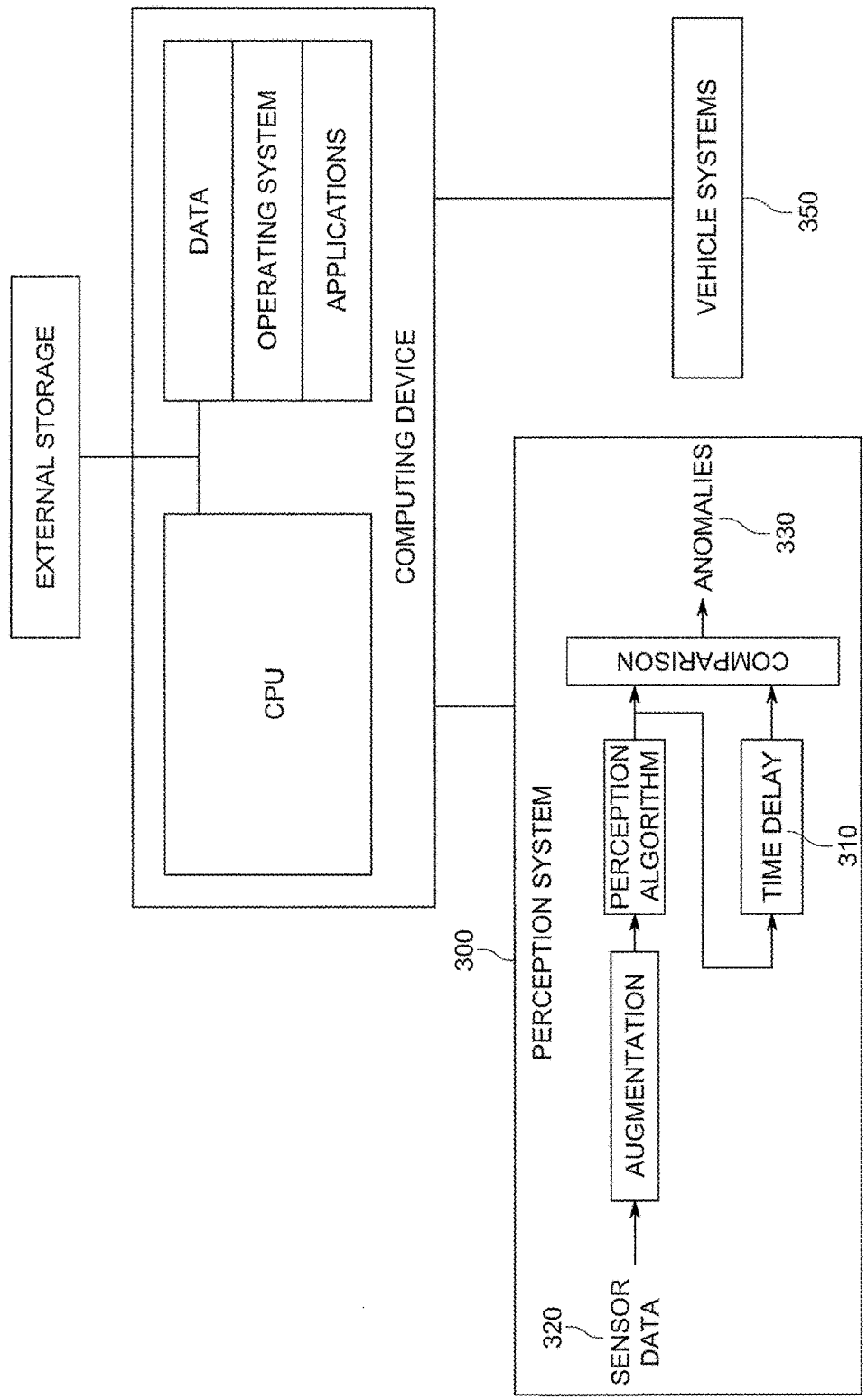
FIG. 5 is a block diagram of an apparatus that can implement another embodiment of a perception evaluation system.

Referring to FIG. 5, an alternate embodiment using a time delay 310 to compare sensor data 320 from different times (e.g., different image frames or different lidar sweeps) is shown. This embodiment is implemented in a perception system 300 that is used in a vehicle 350.

Differences in detection lists, known as anomalies 330, across relatively small time scales (e.g., consecutive image frames) can be due to objects legitimately appearing or disappearing, but can also be due to false negative or false positive perception detections. Anomalies 330 can be manually screened for false negative and false positive perception detections. Alternately, human review time can be reduced by applying heuristics to pre-screen anomalies 330 by, for example, flagging detections that appear and disappear in a short interval of time (a flickering detection that oscillates between a detected and undetected result) as a likely perception algorithm robustness problem. The embodiment of FIG. 4 can also be used with a null augmentation that simply passes sensor data through unchanged and compares the results with those of temporally displaced results.

A specific approach to identifying perception failures in accordance with FIG. 4 is identifying a sequence of frames in which a detection is present in a first frame, absent in a second frame, and reappears in a subsequent (third or later) frame. This is referred to as "flickering." In general, a flickering detection might be explained via a perception failure or an occlusion, such as a telephone pole temporarily blocking the object. However, in typical video, sudden occlusions are unlikely due to high frame rate of the video. In a typical 30 Hz frame, an occlusion would have to have occurred for less than about a tenth of a second to only affect a single frame. Therefore, a flickering detection is more likely to be a missed perception than an occlusion, which makes this embodiment an effective perception failure detector.

Another embodiment includes identifying perception failures via the change in data associated with a detection for an interval of time. For example, if a perception changes classification from a pedestrian to a bush and then back to a pedestrian within an interval of one or several frames, that indicates perception brittleness. This perception failure identification can be used on baseline data and/or augmented data. Substantive changes in other detection attributes across short intervals of time can also be used to identify perception failures, including changes in object classification, object position, object trajectory, perceived future plans/intent, and assessed risk or threat level. Similarly, dual-channel approaches (e.g., FIG. 3 and FIG. 6) that identify substantive differences in such attributes between baseline and augmented detections, even on a single frame, can be used to identify a perception failure.

Figure 6:
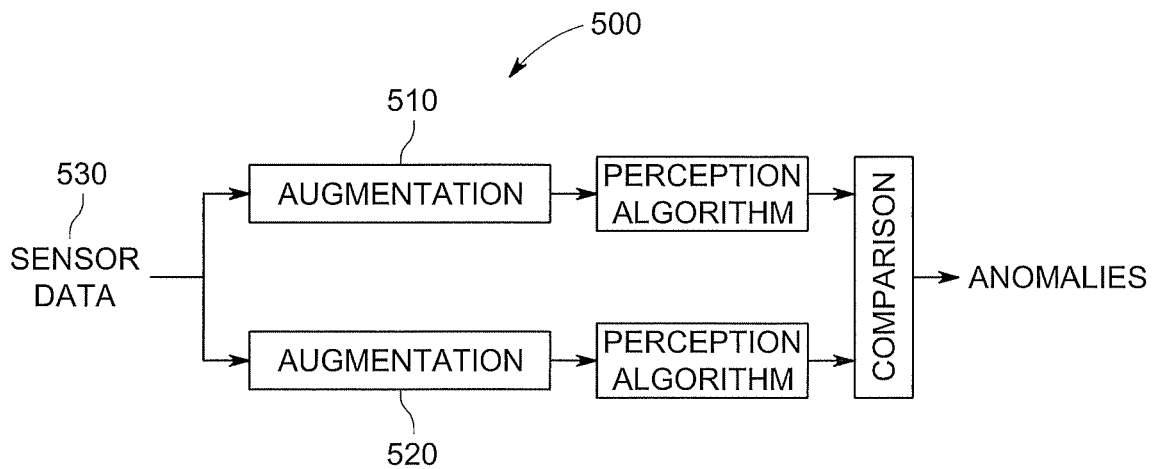
FIG. 6 is a block diagram of an apparatus that can implement another embodiment of a perception evaluation system.

FIG. 6 illustrates an alternate embodiment having two augmentation channels 500. Operation is as with FIG. 3 except both sensor data paths are augmented, preferably with different types or intensities of augmentation, in effect, a first augmentation 510 and a second augmentation 520 of the sensor data 530. (Looked at another way, FIG. 3 is a special case of FIG. 6 in which there is a null augmentation for the upper channel, and thus the descriptions relevant to FIG. 3 apply to FIG. 6 as well.) This approach is advantageous for differential augmentation analysis, such as for determining when perception failures occur with different types or different augmentation parameter values. As will be appreciated by one of skill in the art three or more such channels could be readily used for this purpose with a different augmentation type and/or parameter value for each channel. The different augmentations could be different augmentation algorithms but could also be different augmentation data for a single algorithm. As a specific example embodiment, the previously mentioned embodiment in which a randomized selection from a set of precomputed augmentation patterns was used could be extended to employ a plurality of different randomized precomputed patterns, with each such pattern used on one of a plurality of channels. A possible objective of this approach is to increase the chance that one of a plurality of precomputed augmentation patterns will perturb a data sample across a decision boundary.

Figure 7:
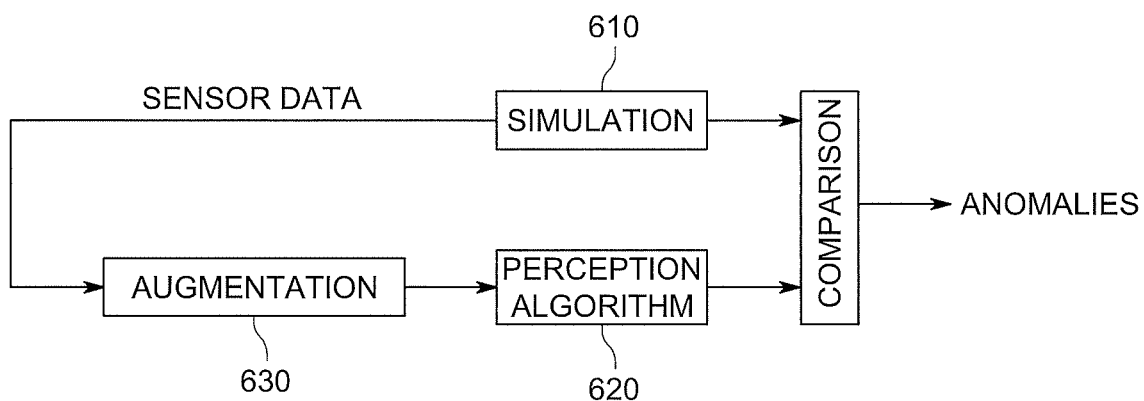
FIG. 7 is a block diagram of an apparatus that can implement another embodiment of a perception evaluation system.

FIG. 7 illustrates another alternate embodiment in which a simulator 610 is used to generate both simulated sensor data and a detection list. This approach provides a form of ground truth data for the detection list with coordinated sensor inputs, permitting measurement of the perception algorithm's robustness under augmentation 630 on an absolute basis against ground truth. This embodiment is also suitable for training the perception algorithm 620 with augmented inputs by using the simulation detection list as labeled data for machine learning training of the perception algorithm against augmented data. (i.e., augmented data is used to train the perception system with the simulation generating training labels).

Figure 8:
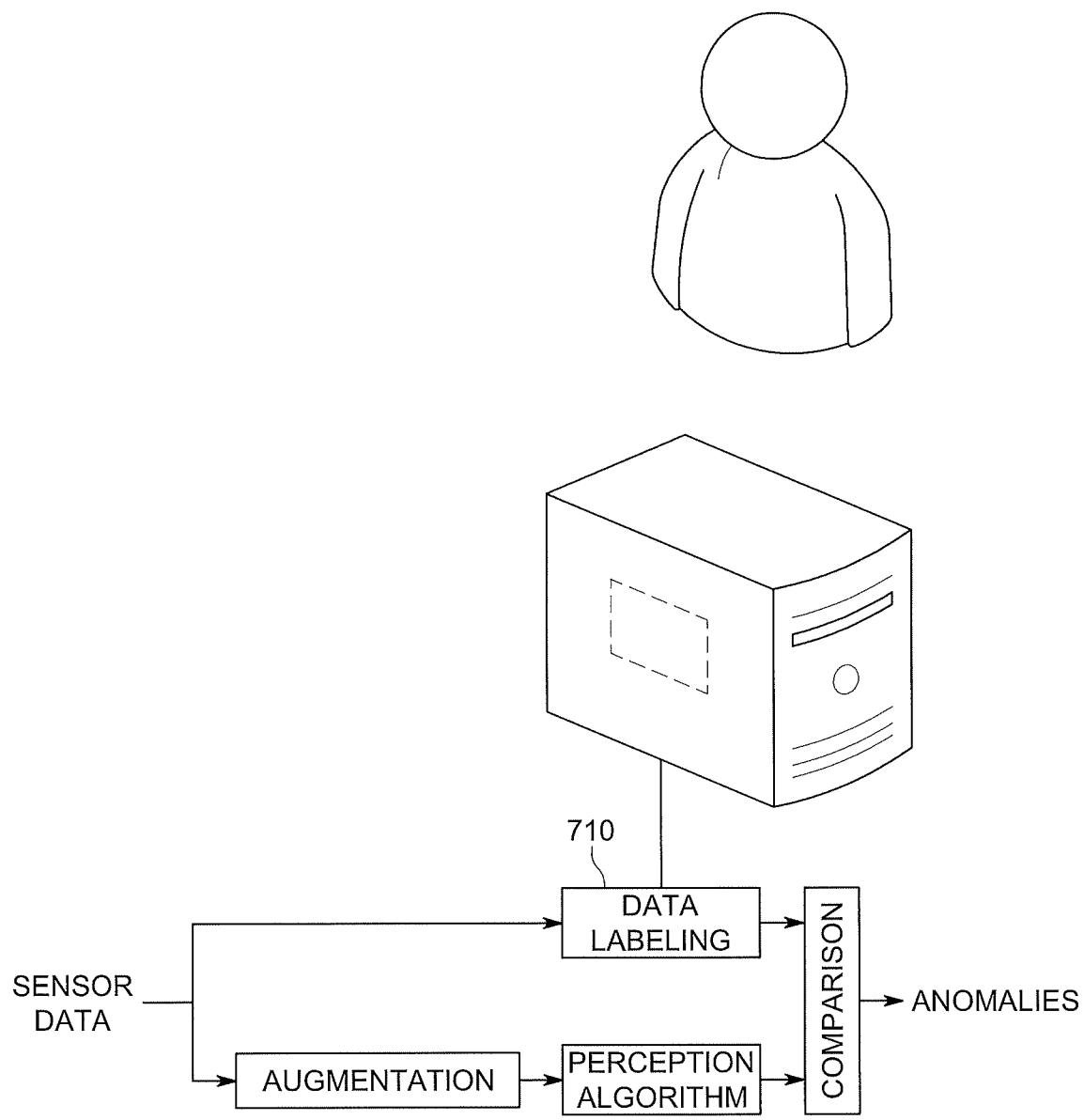
FIG. 8 is a block diagram of an apparatus that can implement another embodiment of a perception evaluation system.

FIG. 8 shows another alternate embodiment of the invention in which the baseline perception algorithm is replaced with an alternate method of establishing so-called ground truth of the detection list. For example, in FIG. 3 the upper perception algorithm block could be replaced by human data labeling or human-assisted computer-based data labeling 710. In such a system the lower perception block processing augmented data would still use a perception algorithm of interest. This embodiment provides a way of testing perception robustness in terms of both false positives and false negatives without concern about the baseline accuracy of the perception algorithm (assuming accurate ground truth labels).

Figure 9:
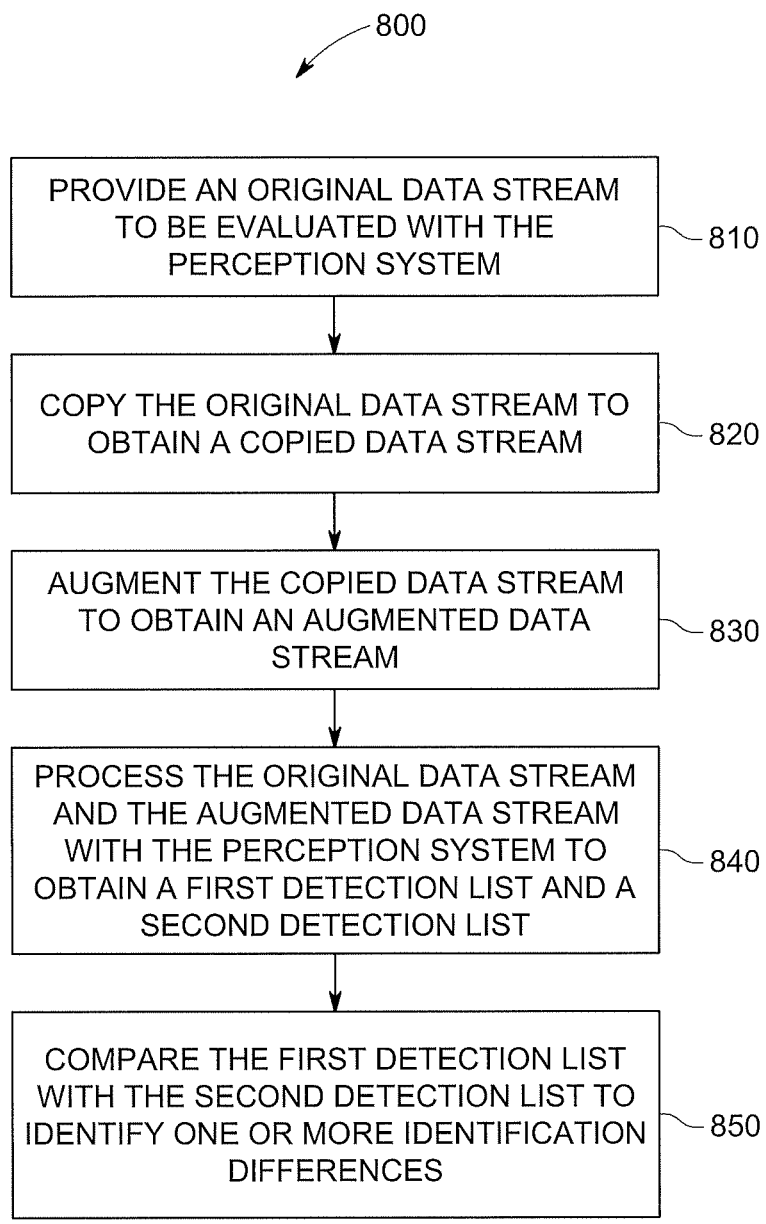
FIG. 9 is a flow chart of an exemplary process in accordance with the disclosure.

The system as described herein is designed to perform an overall method 800, as broadly set forth in FIG. 9. First, an original data stream is obtained from sensors that sense the physical world at 810. In certain embodiments, the sensors are attached to a vehicle that is equipped to travel in an autonomous or semi-autonomous fashion. This original data stream is then copied 820 so that it can be manipulated or augmented as discussed herein. In embodiments, the copied data stream is then augmented with noise at 830 to create an augmented data stream and both the original data stream and the augmented data stream are processed with a perception system to obtain a first detection list and a second detection list at 840 Finally, at 850, the first detection list and the second detection list are compared to identify one or more differences that correlate to possible detection failures. As discussed herein, this process can be modified for specific purposes and this FIG. 8 is not intended to supplant any of the previously discussed methods; rather, it is intended to be an example of a method that is consistent with the present disclosure. This method drastically reduces the amount of human review time needed to check the accuracy of perception results and provides significant information regarding brittleness and perception faults inherent in the perception system that may not otherwise be readily apparent.

Where the use of augmentation is taught in this disclosure, there is an alternate embodiment wherein the amount of augmentation is varied by manipulating the parameters of the augmentation to increase or decrease the amount. Examples of this variance include modifying the noise density, modifying the amount of blur, or scaling up or down the weights of a convolution kernel to increase or decrease the degree to which the augmentation perturbs the sensor data.

The amount of augmentation can be modified, in view of the results of a particular detection list, to determine the level of augmentation that is on the cusp of causing a difference in detection list results between the baseline and augmented sensor data as processed and output by the two copies of the perception algorithm. The amount of the augmentation can then be used as a metric for how brittle the perception algorithm is; it can also be seen as an arbiter of quality. The greater the amount of augmentation required to cause a difference in detection lists, the less brittle the perception algorithm. While single samples at each level of augmentation can be used, for augmentations based on randomized processes, statistical sampling techniques are desirable to establish an augmentation threshold value with a suitable level of statistical confidence.

A brittleness detector with either fixed or variable augmentation intensities can be used both off-line to evaluate perception algorithms, and on-line during real time operations to measure the robustness of the perception system during operation. A low augmentation value that causes a detection list difference for insubstantially modified data flows indicates insufficient robustness margin for perception algorithm operation and can be predictive of a perception failure.

In certain embodiments, an on-line detector (such as in an autonomous vehicle, operating in real time) can be used to identify which data should be retained for later analysis. In this mode of operation, the vehicle performs perception fault detection in accordance with one of the operational modes described and records a portion of the sensor data stream for a limited interval of time responsive to detection of an identified potential or actual perception fault. For example, the system might retain 30 seconds of data before and 10 seconds after the occurrence of a fault detection. This decreases the amount of data that must be retained and transmitted for off-vehicle analysis compared to retaining and transmitting the full vehicle sensor data stream.

In certain embodiments, the comparison block, item 170 in FIG. 3 for example, (which can be a function, a procedural step, a physical computing system, or some combination thereof) performs statistical analysis on the augmented and raw sensor data detection lists to identify potential perception failures. This statistical analysis evaluates previously identified known (labeled) perception failure results to increase the accuracy of future perception failure results. In embodiments, backpropagation algorithms can be used to train the neural networks to better predict which perception results are true positives, false positives, true negatives, and false negatives. Other machine learning, deep learning, and similar approaches can be used as well to improve the efficiency and effectiveness of identifying perception failures.

As will be appreciated by one of skill in the art, the operation of the various embodiments of the invention shown is not limited to a single augmented sensor data channel. For example, FIG. 2 and FIG. 5 could also include one or more additional channels of data passing through various types and intensities of augmentation. Each of the channels would be run through a perception algorithm and would produce detection lists. Such an approach would be advantageous, for example, for determining robustness in various dimensions for different types of augmentations performed on the same sensor data, or for determining robustness for different intensities of the same or similar augmentations performed on the same sensor data stream. It could also be advantageous for comparing the robustness of different perception algorithms to augmentations.

Additional alternate embodiments include, without limitation, the use of different types and levels of augmentation that can be processed via multiple instances of the same perception algorithm to determine the level of robustness of that perception algorithm. In particular, efficient augmentation such as randomized data corruption can be compared against more realistic augmentation such as haze models or defocus models to calibrate or otherwise determine the representativeness of the efficient models for determining robustness or for training effectiveness.

Diverse sensors can be used for comparison, such as two or more of radar, lidar, and video imaging, including augmenting one or more of those sensor feeds.

Augmentation, perception processing, and comparison can be done off-line, in real time, or in semi-real time (on a subset of sensor data, such as every tenth image, or clips of sequences of sensor data that are sampled in bursts periodically from a live data stream, etc.) to achieve tradeoffs in computational power vs. latency.

Figure 10:
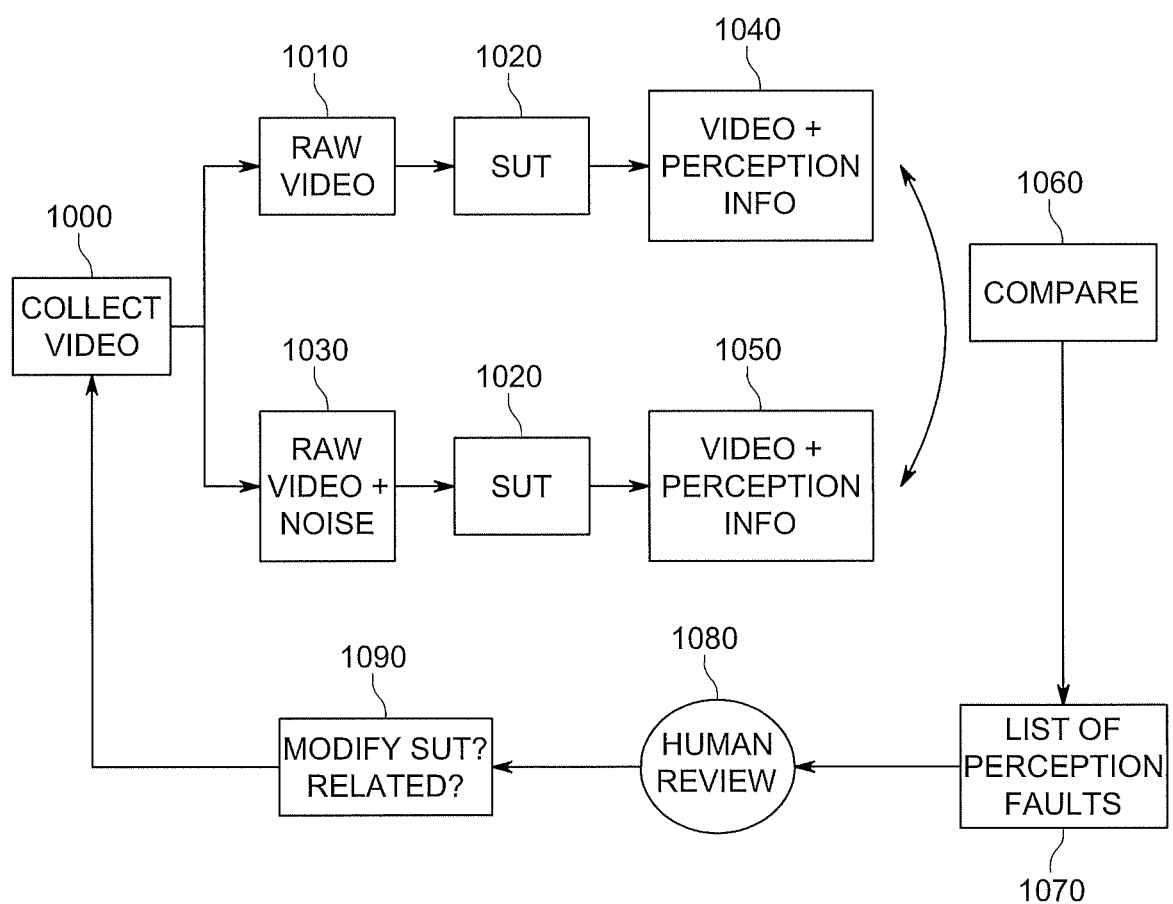
FIG. 10 is an exemplary implementation of the inventive method.

With reference to an embodiment illustrated in FIG. 10, detection of perception failures can be used to identify subsets of stored data or streamed data that are good candidates for labeling to add to training data and/or validation data to improve perception system performance. This has the advantage of identifying images or brief image sequences that provide high value for retraining and/or manual analysis due to the perception system behaving in a brittle manner on those images or image sequences.

In certain embodiments, such as those set forth in FIG. 3, 6 or 8, without limitation, raw sensor data 1010 is collected 1000. This raw sensor data 1000 can be video or some other sensor data as set forth herein or known to those of skill in the art. In a first instance of the raw data, it is fed into a System Under Test (SUT) 1020, which analyzes it and provides raw data output 1040 such as video frames having metadata such as bounding boxes or other information, all as discussed previously. The raw sensor data is also augmented with noise 1030 as previously discussed and evaluated by the SUT to obtain augmented data output 1050 such as video and metadata. As previously explained, the raw data output 1040 is compared 1060 to the augmented data output to identify a list of potential perception failures (faults) 1070 with the SUT 1020. In certain embodiments, a list of these potential perception failures can be subjected to human review 1080 to verify or debunk the faults and determine whether the SUT can be modified 1090 in some way to improve results. In additional embodiments, these so-called "edge cases" (including data resulting in both verified and debunked faults) can be added to the SUT training data sets to improve performance of the perception system.

The various embodiments of the invention can be advantageously used to determine perception algorithm robustness, identify weak performance of perception algorithms, predict perception algorithm failure, and identify actual perception algorithm failure. The invention can be implemented via physical devices (e.g., an augmentation physical computing module comprising hardware and software that modifies data streams sent to a separate perception system as well as a physical computing module that performs comparison) as well as via purely software mechanisms hosted on a convenient computing platform.

The terms "fault" and "failure" are used interchangeably, with each term encompassing weak detections, false negatives, false positives, and any other problem or potential problem with perception performance, accuracy, precision, recall, or other desirable property or metric. The term "object" includes without limitation physical objects, characteristics of a scene (e.g., day, night, rain, sun, low contrast, sun glare), and evaluative results (e.g., sensor data is classified as presenting a situation that is "high risk" vs. "low risk").

Certain aspects of the embodiments set forth herein include process steps. It should be noted that the process steps of the embodiments could be embodied in software, firmware or hardware, and when embodied in software, could be downloaded to reside on and be operated from different platforms used by a variety of operating systems. The embodiments can also be in a computer program product which can be executed on a computing system.

The embodiments also relate to a system for performing the operations herein. This system may be specially constructed for the purpose, e.g., a specifically constructed or selected array of computing devices, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. The memory/storage can be transitory or non-transitory. Memory can include any of the above and/or other devices that can store information/data/programs. Furthermore, the computing devices referred to in the specification may include a single processor or may be architectures employing multiple processor designs for increased computing capability.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the claims.

What is claimed is:

1. A computer-implemented method for measuring performance of a perception system comprising:
   receiving a raw sensor data input stream;
   splitting the raw sensor data input stream into two branches, each branch forming one of a pair of sensor data input streams to be evaluated with the perception system;
   running a data augmentation algorithm on at least one of the pair of sensor data input streams to obtain an updated pair of sensor data input streams with the data augmentation algorithm introducing noise into at least one of the pair of sensor data input streams to perturb one of the least one of the updated pair of sensor data input streams to cause at least one object in the one of the least one of the updated pair of sensor data input streams to cross a classification decision boundary line;
   processing the updated pair of sensor data input streams with the perception system to obtain a first detection list from the raw sensor data input stream and a second detection list from the updated pair of sensor data input streams with each detection list including the crossing of the classification decision boundary line;
   comparing the first detection list with the second detection list to identify one or more differences between the one or more detections of objects present in the first detection list and the one or more detections of objects present in the second detection list, and
   identifying one or more perception weaknesses indicated by the one or more differences.

2. The method of claim 1, further comprising identifying flickering detections in the first or the second detection list as perception weaknesses.

3. The method of claim 1, wherein the noise comprises one or more of Gaussian blur, Gaussian noise, photorealistic haze, photorealistic defocus, alpha channel blend, JPEG compression, brightness alteration, salt and pepper, fixed pixel values, dropped channel, additive noise, black box disturbances, and convolutional operations.

4. The method of claim 3, further comprising manipulating a set of parameters to generate the augmented data wherein the set of parameters includes at least one of noise density, blur, and the weights of a convolution kernel.

5. The method of claim 4, further comprising increasing the amount of data augmentation that is added to the at least one of the pair of sensor data input streams until objects are no longer detected.

6. The method of claim 1, wherein each of the pair of detection lists comprises a list of objects with each object having one or more of an object type and a classification machine learning confidence.

7. The method of claim 6, wherein each object on the list of objects comprises at least one of an object location, time information, trajectory information, and expected future behavior information.

8. The method of claim 1, wherein the first detection list is the result of a raw sensor data input stream and the second detection list is the result of an augmented sensor data input stream, the method further comprising predicting a perception failure responsive to a detection loss in the second detection list followed by a detection loss in the first detection list.

9. The method of claim 8, wherein the detection loss occurs when a detection has a machine learning confidence lower than a predetermined percentage.

10. The method of claim 8, wherein the detection loss occurs when an absolute value of a difference between a machine learning confidence of a detection in the second detection list and a detection in the first detection list is greater than a predetermined amount.

11. The method of claim 1, further comprising identifying gaps in training data based on the perception weaknesses.

12. A system for measuring performance of a perception system comprising a memory or other data storage facility and one or more processors configured to perform the steps of:
   receiving a raw sensor data input stream;
   splitting the raw sensor data input stream into two branches, each branch forming one of a pair of sensor data input streams;
   running a data augmentation algorithm on at least one of the pair of sensor data input streams to obtain an updated pair of sensor data input streams with the data augmentation algorithm introducing noise into at least one of the pair of sensor data input streams to perturb one of the least one of the updated pair of sensor data input streams to cause at least one object in the one of the least one of the updated pair of sensor data input streams to cross a classification decision boundary line;

producing a pair of detection lists with one of the detection lists being produced from the raw sensor data input stream and the other detection list being produced from the updated pair of sensor data input streams with the perception system with each detection list including the crossing of the classification decision boundary line;

comparing one of the pair of detection lists with the other of the pair of detection lists to identify differences between the one or more detections of objects present in the first detection list and the one or more detections of objects present in the second detection list, and identifying one or more perception weaknesses indicated by the one or more differences.

13. The system of claim 12, further configured to perform the step of identifying flickering detections in the first or the second detection list as perception weaknesses.

14. The system of claim 12, wherein the noise comprises one or more of Gaussian blur, Gaussian noise, photorealistic haze, photorealistic defocus, alpha channel blend, JPEG compression, brightness alteration, salt and pepper, fixed pixel values, dropped channel, additive noise, black box disturbances, and convolutional operations.

15. The system of claim 12, wherein each of the pair of detection lists comprises a list of objects with each object having one or more of an object type and a classification machine learning confidence.

16. The system of claim 15, wherein each object on the list of objects includes at least one of an object location, time information, trajectory information, and expected future behavior information.

17. The system of claim 12, further configured to perform the step of manipulating a set of parameters to generate the augmented data wherein the set of parameters includes at least one of noise density, blur, and the weights of a convolution kernel.

18. The system of claim 17, further configured to perform the step of increasing the amount of data augmentation that is added to the at least one of the pair of sensor data input streams until objects are no longer detected.

19. The system of claim 12, further configured to identify gaps in training data based on the perception weaknesses.

20. A non-transitory computer-readable medium for measuring performance of a perception system, comprising instructions stored thereon, that when executed on a processor, perform the steps of:

receiving a raw sensor data input stream;

splitting the raw sensor data input stream into two branches, each branch forming one of a pair of sensor data input streams;

running a data augmentation algorithm on at least one of the pair of sensor data input streams to obtain an updated pair of sensor data input streams with the data augmentation algorithm introducing noise into at least one of the updated pair of sensor data input streams to perturb one of the least one of the updated pair of sensor data input streams to cause at least one object in the one of the least one of the updated pair of sensor data input streams to cross a classification decision boundary line;

producing a pair of detection lists with one of the detection lists being produced from the raw sensor data input stream and the other detection list being produced from the updated pair of sensor data input streams with the perception system with each detection list including the crossing of the classification decision boundary line;

comparing one of the pair of detection lists with the other of the pair of detection lists to identify differences between the one or more detections of objects present in the first detection list and the one or more detections of objects present in the second detection list, and identifying one or more perception weaknesses indicated by the one or more differences.

\* \* \* \* \*